March 16, 1965  G. O. PRINGLE  3,173,607
AIR PUMP

Filed April 11, 1962  2 Sheets-Sheet 1

INVENTOR
GEORGE O. PRINGLE

BY *Ayates Dowell I & II*
ATTORNEY

March 16, 1965  G. O. PRINGLE  3,173,607
AIR PUMP
Filed April 11, 1962  2 Sheets-Sheet 2
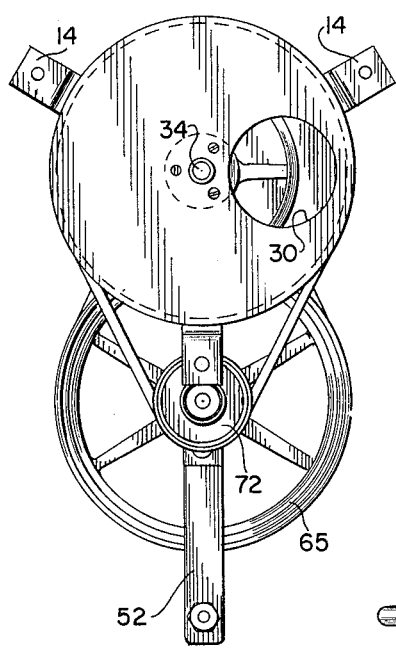
FIG. 3
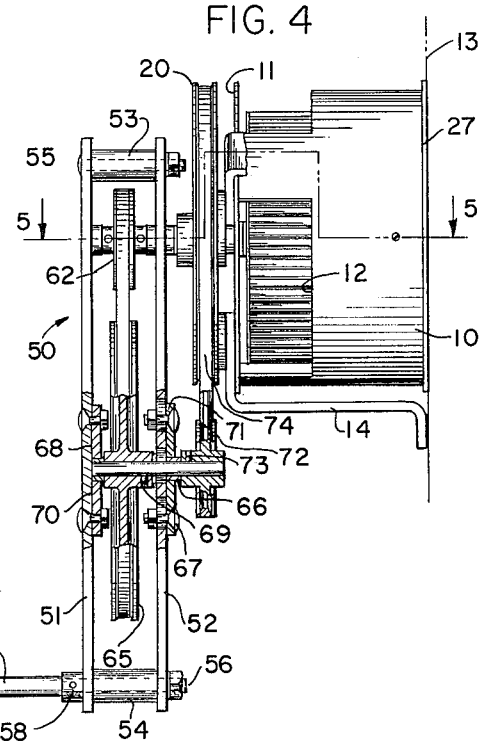
FIG. 4
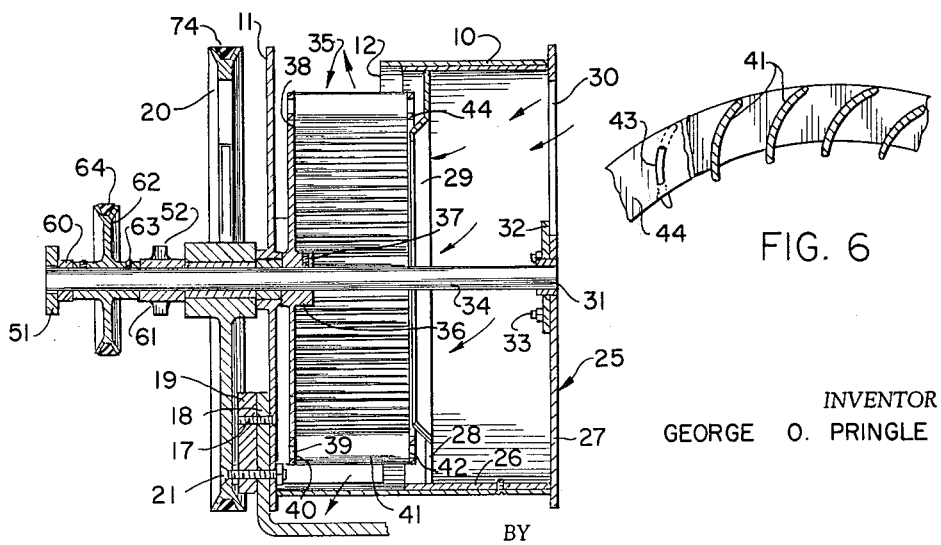
FIG. 5
FIG. 6
INVENTOR
GEORGE O. PRINGLE
BY
ATTORNEY

United States Patent Office 3,173,607
Patented Mar. 16, 1965

3,173,607
AIR PUMP
George O. Pringle, 421 9th St., Leesburg, Fla.
Filed Apr. 11, 1962, Ser. No. 186,674
8 Claims. (Cl. 230—215)

This invention relates to buildings and other structures of various kinds, and to equipment employed for supplying or providing air necessary for breathing and for maintaining the proper humidity.

The invention relates particularly to structures which extend below ground level and are intended to house and provide protection for humans from nuclear blasts and subsequent fall-out of radio active matter, and in which shelters necessary air is required even though it has to be manually supplied for sustaining life when power has failed or otherwise is not available.

Heretofore, blowers and air pumps of various kinds have been produced for moving air from one location to another and some of which were manually operated; however, these blowers have been difficult to operate, expensive, unwieldy, did not supply a sufficient quantity of air, and have been otherwise unsatisfactory.

It is an object of the invention to overcome the difficulties enumerated and to provide a manually operated blower which will move a maximum volume of air with a minimum of effort.

A further object of the invention is to provide a manually operated blower having novel means for altering the ratio between the driving and driven members without the use of gears for supplying clean decontaminated air to a fall-out shelter.

Figure 1:
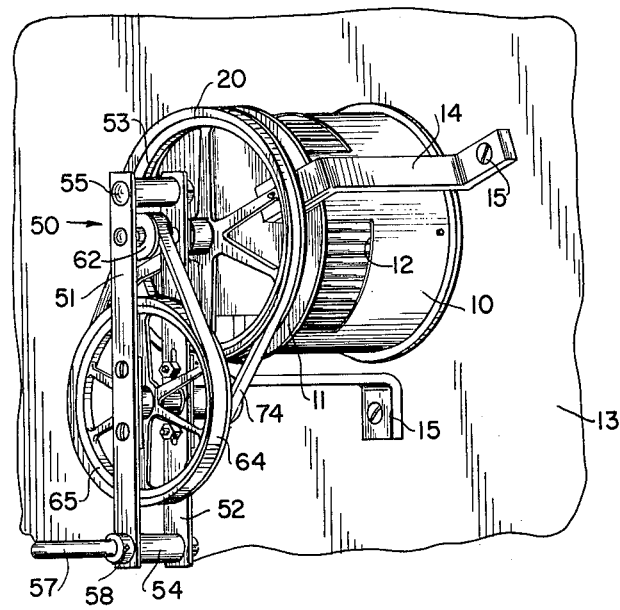
Figure 2:
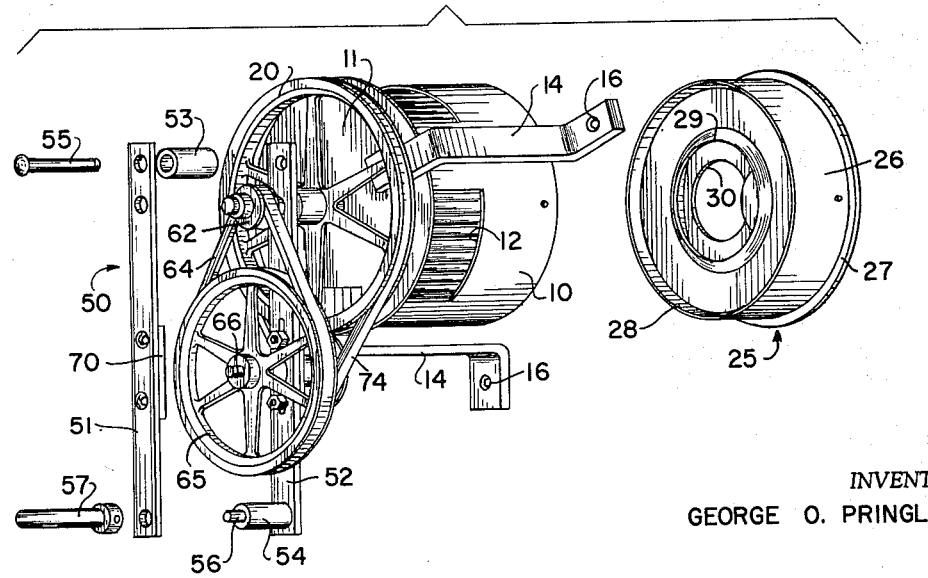

Other objects and advantages of the invention will be apparent from the following description taken in conjunction with the accompanying drawing wherein:

FIG. 1 is a perspective illustrating one application of the invention;

FIG. 2, an exploded perspective thereof;

FIG. 3, an enlarged rear elevation;

FIG. 4, a side elevation with portions broken away for clarity;

FIG. 5, an enlarged section on the line 5—5 of FIG. 4; and

FIG. 6, an enlarged fragmentary section of the vanes of the blower.

Briefly stated the present invention is a relatively simple, practical, manually operated blower for aerating or providing the necessary air for breathing for a fall-out shelter, such blower including a housing having an inlet from an air shaft with a filter, and a plurality of air outlets for the discharge of air into the area of the shelter, and which housing is provided with a manually operated rotary blower in which power is supplied by a hand crank through a series of pulleys for obtaining a greatly increased rate of rotation with corresponding blowing or pumping action for providing the necessary aeration of the shelter.

With continued reference to the drawings, a generally cylindrical housing 10 having an end wall 11 and a series of annular outlet openings 12 adjacent to such end wall is mounted on the wall 13 of a building by a plurality of Z-shaped legs 14. Such legs are connected to the wall 13 by fasteners 15 which pass through openings 16 in the lower flange thereof and are connected to the end wall 11 by fasteners 17 which pass through openings 18 in the upper flange. A spacer block 19 is mounted on each of the upper flanges of the legs 14 by the fasteners 17 and such spacers are adapted to support a fixed sheave or pulley 20 by fasteners 21.

The open end of the housing 10 receives an insert 25 including a cylindrical sleeve 26 of a diameter to be telescopically received within the housing 10. The sleeve 26 is provided with an end wall 27 which extends outwardly of the housing 10 and is adapted to abut the building wall 13. If desired, a mastic or filler compound may be inserted between the wall 27 and the building wall 13 to exclude air and prevent the air from passing between such walls. The sleeve 26 has a partition 28 adjacent to the opposite end thereof and such partition has a relatively large central opening defined by an outwardly turned frusto-conical portion 29.

In order to introduce air into the sleeve, the end wall 27 has an opening 30 which is offset from the center of such wall and is in communication with an air shaft (not shown) for supplying air from the atmosphere. A bushing or bearing 31 is mounted centrally of the wall 27 and is supported by a plate 32 mounted on the end wall 27 by fasteners 33. The bearing 31 rotatably receives one end of a shaft 34 on which a squirrel-cage type of impeller 35 is mounted. The impeller 35 includes a central hub 36 fastened by a set screw 37 to the shaft 34 and such hub supports an end plate 38. The end plate 38 is provided with a plurality of generally radial slots 39 in which is disposed the end tab 40 of a plurality of arcuate vanes 41. The opposite ends of such vanes terminate in a tab 42 received within openings 43 of a support ring 44 to form a unitary structure open at one end.

In order to rotate the impeller 35, an operating lever 50 is provided and comprises a pair of parallel bars 51 and 52 maintained in spaced relation to each other by spacers 53 and 54. Spacer 53 receives a bolt and nut 55 at one end of the bars 51 and 52 and spacer 54 receives a pin 56 at the other end of such bars. One end of the pin 56 passes through the bar 51 and receives an operating handle 57 attached thereto by a set screw 58. Bushings or bearings 60 and 61 are welded or otherwise attached to the bars 51 and 52 respectively and such bearings receive the shaft 34 and rotatably mount such bars thereon.

A relatively small driven pulley 62 is adapted to be fixed to the shaft 34 intermediate the bearings 60 and 61 by set screws 63 or other fasteners. The pulley 62 is driven by a belt 64 from a larger pulley 65 fixed on a shaft 66 by a set screw 67. The shaft 66 is rotatably mounted in bearings 68 and 69 carried by plates 70 and 71 which in turn are mounted on the parallel bars 51 and 52 respectively in spaced relation to the shaft 34. One end of the shaft 66 projects inwardly of the bar 52 and receives a pulley 72 fixed thereon by set screw 73. Such pulley 72 is adapted to be driven by a belt 74 in engagement with the fixed pulley 20.

In the operation of the device, the lever 50 is rotated by the handle 57 and upon such rotation the pulley 72 is rotated independently of such lever by the belt 74 which engages the fixed pulley 20. Pulley 72 rotates the shaft 66 and pulley 65 mounted thereon and the pulley 65 in turn drives pulley 62 by means of belt 64. When pulley 62 is rotated, it rotates shaft 34 to which the impeller 35 is mounted and such impeller is caused to rotate.

When the operating lever is rotated in one direction, air is drawn through the opening 30 and into the interior of the impeller 35 and thereafter is forced by the blades 41 through the annular openings 12 into the room. When the operating lever is rotated in the opposite direction, air will still be drawn through the opening 30 into the impeller 35 and due to the configuration of the blades 41, such air will be forced into the room; however the efficiency of the blower will be greatly reduced. In this manner the operating lever may be rotated in either direction to force air into the shelter.

It will be noted that in the above construction the housing 10, insert 25 and impeller 35 may all be produced of relatively thin lightweight material to reduce the weight as well as the cost of the device. This is possible since the legs 14 are firmly attached at one end to the fixed pulley 20 and at the opposite end to a plane surface of a rigid structural member such as the wall 13. The housing 10 and insert 25 preferably are held slightly in compression against the structural member to maintain the air-tight integrity of the connection and to impart strength and rigidity to such housing. Due to the rigidity of the mounting, the air pump is easier to operate and substantially all of the energy will be transmitted to the turning of the impeller.

Although the device has been illustrated and described as being mounted on the wall of the structure in a substantially vertical position, it will be apparent that it could be mounted on an independent stand or pedestal, in either vertical or horizontal position, and connected to the air intake by either a rigid or flexible air duct.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:
1. Apparatus for circulating air comprising
 (A) a housing having
  (1) an end wall,
  (2) a plurality of outlet openings adjacent to said end wall,
  (3) a sleeve telescopically received within said housing,
  (4) a shaft,
  (5) an impeller fixed to said shaft,
  (6) a fixed pulley mounted on said end wall,
 (B) an operating lever including
  (1) a pair of parallel bars,
  (2) spacers separating said parallel bars,
  (3) an operating handle connected to one end of said parallel bars,
  (4) said bars being rotatably mounted on the shaft of said housing,
  (5) a first rotable pulley fixed to said housing shaft intermediate said bars,
  (6) an operating lever shaft carried by said parallel bars and spaced from said housing shaft,
  (7) a second rotatable pulley fixed to said lever intermediate said bars,
  (8) a belt connecting said first rotatable pulley and said second rotatable pulley.
  (9) a third rotatable pulley fixed to said lever shaft,
  (10) a belt connecting said third rotatable pulley and said fixed rotatable pulley on said housing,
whereby rotation of said operating lever will cause rotation of said impeller at a different rate of speed.

2. Apparatus for circulating air comprising
 (A) a housing having
  (1) a plurality of outlet openings,
  (2) a central shaft,
  (3) an impeller fixed to said shaft,
  (4) a fixed pulley mounted on said housing concentric about said shaft,
 (B) an operating lever having
  (1) an operating handle,
  (2) said lever being rotatably mounted on said central shaft,
 (C) a first rotatable pulley mounted on said central shaft,
 (D) a lever shaft carried by said operating lever in spaced relation to said central shaft,
 (E) a second rotatable pulley fixed to said lever shaft,
 (F) a belt connecting said first rotatable pulley and said second rotatable pulley,
 (G) a third rotatable pulley fixed to said lever shaft,
 (H) a belt connecting said third rotatable pulley and said fixed pulley on said housing
whereby rotation of said operating lever will cause rotation of said impeller at a different rate of speed.

3. A manually operated blower for supplying air to a fall-out shelter comprising
 (A) a housing having
  (1) a central shaft,
  (2) an impeller mounted on said shaft,
  (3) a fixed pulley mounted on said housing,
 (B) an operating lever,
  (1) said lever being rotatably mounted on said shaft,
 (C) rotating means mounted on said shaft,
 (D) a shaft carried by said operating lever,
 (E) a pair of pulley means mounted on said operating lever shaft,
 (F) belt means connecting one of said pulley means to said rotating means and connecting the other of said pulley means to said fixed pulley
where by rotation of said operating lever will cause rotation of said impeller at an increased rate of speed.

4. An air pump comprising
 (A) a housing having
  (1) inlet and outlet passages for admission and discharge of air,
  (2) an impeller in said housing,
  (3) a shaft mounting said impeller,
  (4) a first rotatable pulley fixed to said shaft for driving the latter,
  (5) a belt for driving said first pulley,
  (6) a second larger rotatable pulley engaging said belt for driving the same,
  (7) a second shaft mounting said second rotatable pulley,
  (8) a crank mounting said second shaft,
  (9) a third smaller pulley fixed to said second shaft,
  (10) a belt engaging said third rotatable pulley for driving the same,
  (11) a larger fixed pulley engaged by said last mentioned belt,
whereby when said crank is rotated said impeller will be driven with multiplied speed due to said pulley differential.

5. An air blower comprising
 (A) a bladed blowing element,
 (B) a first rotatably mounted shaft supporting said element,
 (C) a relatively large pulley non-rotatably mounted about said shaft as an axis,
 (D) a first rotatably mounted pulley fixed to said first shaft and by which the latter can be rotated,
 (E) a crank rotatable about said first shaft as an axis,
 (F) a second larger rotatably mounted pulley carried by said crank and spaced from said first rotatable pulley,
 (G) a first belt driving said first rotatable pulley from said second larger pulley,
 (H) a second shaft mounting said second larger pulley,
 (I) a third rotatable pulley mounted on said second shaft for rotating the latter, and
 (J) a second belt extending around said non-rotatably mounted pulley and said third rotatable pulley
whereby when said crank is rotated said second shaft carried by the crank will be rotated by engagement of the third rotatable pulley thereon with the belt which extends around the non-rotatable pulley, and said first belt will drive said first shaft and said bladed blowing element at a speed corresponding to the size differential between the four pulleys.

6. The combination of
 (A) a bladed blower member and
 (B) means for rotating the same at a relatively high rate comprising (1) two pairs of differential size belt-connected pulleys,
   (a) one pulley of the first pair being fixed, and
   (b) the pulleys of the second pair being rotatable,
   (c) one pulley of each pair being concentric with one pulley of the other pair and the
   (d) second pulley of the second pair having an axis spaced from that of the first pulley of said second pair, and
(C) crank means mounting said second pulley of the second pair and
   (1) rotatable around the first pulley of said second pair, and
   (2) serving also as the axis of the second pulley of the first pair,
whereby upon the rotation of said crank the rotatable pulley of the first pair carried by the shaft of the second pulley of the second pair will be rotated by contact with the belt which extends around the fixed pulley and will in turn drive said bladed element.

7. The structure of claim 2 in which
(A) said housing is constructed of
   (1) relatively thin lightweight material,
(B) an insert telescopically received within said housing and constructed of
   (1) relatively thin lightweight material,
(C) a plurality of rigid legs for mounting said housing and said fixed pulley on a rigid structural member,
   (1) said legs being substantially equally spaced about the periphery of said housing and
   (2) of a length to maintain said housing and said insert in contact with the structural member.

8. The structure of claim 2 in which
(A) said housing is constructed of
   (1) relatively thin lightweight material,
(B) a plurality of rigid legs for mounting said housing and said fixed pulley on a rigid structural member,
   (1) said legs being substantially equally spaced about the periphery of said housing and
   (2) of a length to maintain said housing in contact with the structural member.

References Cited in the file of this patent

UNITED STATES PATENTS

| | | |
|---|---|---|
| 185,953 | Overstreet | Jan. 2, 1877 |
| 228,293 | Allen | June 1, 1880 |

FOREIGN PATENTS

| | | |
|---|---|---|
| 14,371 | Great Britain | July 12, 1905 |
| 326,968 | Italy | June 28, 1935 |